United States Patent [19]

Nair

[11] 4,392,180
[45] Jul. 5, 1983

[54] SCREEN-PRINTABLE DIELECTRIC COMPOSITION

[75] Inventor: Kumaran M. Nair, East Amherst, N.Y.

[73] Assignee: E. I. Du Pont de Nemours and Company, Wilmington, Del.

[21] Appl. No.: 373,279

[22] Filed: Apr. 29, 1982

Related U.S. Application Data

[63] Continuation-in-part of Ser. No. 169,495, Jul. 16, 1980, abandoned.

[51] Int. Cl.³ ............................................. C04B 35/46
[52] U.S. Cl. ................................ 361/321; 501/18; 501/20; 501/21; 501/22; 501/42; 501/137; 501/138; 501/139
[58] Field of Search ............... 501/134, 135, 136, 137, 501/138, 139, 42, 18, 20, 21, 22; 361/312, 320, 321, 322; 357/10

[56] References Cited

U.S. PATENT DOCUMENTS

| | | | |
|---|---|---|---|
| 3,268,783 | 8/1966 | Saburi | 357/10 |
| 3,340,074 | 9/1967 | Herczog | 501/138 |
| 3,619,220 | 11/1971 | Maher | 501/138 |
| 3,649,353 | 3/1972 | Ulrich | 501/18 |
| 4,010,133 | 3/1977 | Nakayama | 501/139 X |
| 4,027,074 | 5/1977 | Cross et al. | 423/593 |
| 4,072,780 | 2/1978 | Zillman | 361/321 X |
| 4,218,723 | 8/1980 | Payne et al. | 361/321 |
| 4,220,547 | 9/1980 | Abe et al. | 501/139 |
| 4,222,783 | 9/1980 | Atsumi et al. | 501/138 |
| 4,283,753 | 8/1981 | Burn | 361/321 |

FOREIGN PATENT DOCUMENTS 574577  1/1946  United Kingdom .

OTHER PUBLICATIONS

Holscher, Harry H. "The Relationship of Viscosity to Processing of Glass" Owens Illinois Technical Center, Toledo, Ohio, Apr. 1968.

Rawson, H. *Inorganic Glass–Forming Systems* published by Academic Press, London (1967) p. 206.

*Primary Examiner*—Helen M. McCarthy

[57] ABSTRACT

Thick film dielectric compositions suitable for screen-printing comprising a substituted perovskite, an inorganic dopant, and a low temperature-devitrifiable frit or glass. Upon firing the dielectric composition is highly hermetic.

20 Claims, No Drawings

SCREEN-PRINTABLE DIELECTRIC COMPOSITION

CROSS REFERENCE TO PRIOR APPLICATION

This application is a continuation-in-part of pending application Ser. No. 169,495, filed July 16, 1980 now abandoned.

FIELD OF THE INVENTION

The invention relates to thick film dielectric compositions and particularly to such compositions having good hermetic properties.

BACKGROUND OF THE INVENTION

The use of screen-printable dielectric compositions in paste form to form printed capacitors for use with silver-bearing terminations is relatively new in the art of constructing electronic systems.

In general, such dielectric compositions contain a ferro-electric material, preferably $BaTiO_3$, glass, organic vehicle and optionally certain inorganic materials such as $ZrO_2$, $Fe_2O_3$, for example as Curie point shifters. Such compositions which are available commercially can be printed over precious metal electrodes and then be cofired with a top electrode to form capacitor. The stability of these printed capacitors is affected adversely mainly in two ways: (1) by low thickness; and (2) by water absorption. The dielectric thickness must be greater than a certain minimum value, depending on the maximum dielectric constant (K). The major dielectric property affected by a thin dielectric with moderately high K (defined here as a K of about 50 or above) is the insulation resistance (IR). Under load, very thin dielectrics show a decrease in IR values during aging. Thicker dielectrics generally do not show such a degradation in properties. Though it is not known with certainty, it is likely that this degradation in insulation resistance is related to the diffusion of ionic species from anode to cathode.

In addition, reversible absorption of water leading to ionization and migration of ionizable oxides is also a major problem of screen-printed capacitors. In the past, this has generally been eliminated by encapsulating the whole capacitor with organic or inorganic materials such a epoxy resins, silicones, glasses and the like. However, encapsulation processing is very costly and could be avoided with the development of a dielectric system which does not absorb moisture and, if moisture is absorbed, the materials in the system do not ionize and/or migrate species from the anode to cathode.

BRIEF DESCRIPTION OF THE INVENTION

In its broadest aspect, the invention embodies thick film screen printable heterogeneous compositions suitable for making hermetic thick film capacitors. These new composites consist of a substituted perovskite and an inorganic dopant therefor as crystalline functional phases and a low temperature-melting devitrifiable glass or frit as an amorphous functional phase.

The invention is therefore directed to a dielectric powder composition consisting essentially of an admixture of a substituted perovskite corresponding to the formula $Ba_{1-x}Sr_xTiO_3$, wherein X is from 0.1 to 0.9, (2) at least one inorganic dopant containing an ionic species selected from the cations $Bi^{3+}$, $Ca^{2+}$, $Cs^{1+}$, $Fe^{2+}$, $Fe^{3+}$ and $Pb^{2+}$, $Zn^{2+}$ and the anion $F^-$, and (3) a low temperature melting divitrifiable glass or frit.

In another aspect the invention is directed to printable thick film paste made from such powdered compositions. In a still further aspect the invention is directed to capacitors made from printed paste formulated from the above described dielectric powder compositions.

DETAILED DESCRIPTION OF THE INVENTION

A. Substituted Perovskite

The dielectric composition of this invention contains 30–90 parts by weight, based on the total solids weight of the composition, of substituted perovskite and preferably 40–75 parts.

The perovskite can vary in both particle size and crystal structure. The crystal structure can be either cubic or tetragonal. The particle size can be 0.1 $\mu$m to 4 $\mu$m. Preferably the powder particles are less than 2 $\mu$m in size and have tetragonal crystal structure, as determined by X-ray diffraction. The major impurities as determined by emission spectroscopy (<100 ppm) are Zn, Ca and Sr ions.

The above described substituted perovskites are prepared by solid state reaction of the metal titanates, that is, barium titanate and strontium titanate, at a high temperature. Because the reaction is diffusion limited the time to obtain a given degree of substitution can be shortened by raising the reaction temperature or conversely the temperature can be lowered by increasing the reaction time. The following procedure has been found to be very satisfactory for making these materials: (1) the barium and strontium titanates are finely divided and dry mixed intimately by ball milling, using both plastic balls and a plastic container to keep contamination low; (2) the physical admixture of titanates is heated at a rate of 1200° C. per hour to a temperature of 1300° C. at which it is held for two hours. To avoid contamination the reaction vessel should be either 99.98% alumina or platinum; (3) the reaction product is cooled to room temperature; and (4) the cooled reaction product is ground in the same manner as the reactants to the desired particle size distribution.

The composition of the resultant substituted perovskite is readily determined by X-ray diffraction techniques.

While the value of X in the foregoing formula can range from 0.1 to 0.9, it is preferably from 0.3 to 0.6. A particularly preferred substituent perovskite is $Ba_{0.66}Sr_{0.34}TiO_3$.

B. Dopant

The inorganic material suitable for the compositions of the invention are those "doping" agents or "dopants" which are capable of introducing any of the above listed ions into the lattice of the substituted perovskite when the entire composition is subject to firing. A wide variety of compounds containing these ions, can be used such as oxides, halides, and the like and mixtures of these. The dopants are used at concentrations of from 10 to 35% by weight of total solids in order to change the physical properties of the fired composition.

C. Devitrifiable Glass and Frit

The devitrifiable glass and frit component of the dielectric compositions of this invention is a devitrifiable, low-softening point material which is used at a level of 1-7 parts by weight. By low-softening point is meant a softening point below 850° C. and preferably below 600° C. as measured by the fibre elongation method (ASTM—C338-57). The glass or frit utilized in this invention also has to have a low viscosity at the firing temperature to aid liquid phase sintering of inorganic particulates and must be devitrifiable during the firing cycle and specifically at the cooling part of the firing cycle. In particular, it should have a specific viscosity (log $\eta$) at the firing temperature of less than 6, and be capable of aiding liquid phase sintering of substituted perovskite particles.

Typical examples of glasses meeting the above criteria are lead germanate glasses containing, by weight 50-80% $Pb_3O_4$ and 10-30% $GeO_2$. A particular preferred glass contains 78.5% $Pb_3O_4$ and 21.5% $GeO_2$.

The glasses are prepared by conventional glass-making techniques, i.e., by mixing the desired components in the desired proportions and heating the mixture to form a melt. As is well known in the art, heating is conducted to a peak temperature and for a time such that the melt becomes entirely liquid and homogeneous. In preparing the compositions of the invention, the components are premixed by shaking in a polyethylene jar with plastic balls and then melted in a platinum crucible to 800°-850° C. The melt is heated at the peak temperature for a period of 1 to 1½ hours. The melt is then poured into cold water. The maximum temperature of the water during quenching is kept as low as possible by increasing the volumetric ratio of water to melt. The crude frit after separation from water is freed of residual water by drying in air or by displacing the water with methanol. The crude frit in slurry form is then ball-milled for 3-5 hours in alumina containers using alumina balls. Alumina picked up by the materials, if any, is not within observable limits as measured by X-ray diffractional analysis.

After discharging the milled frit slurry from the mill, excess solvent is removed by decantation and the frit powder is air dried at room temperature. The dried powder is then screened through a 325 standard mesh screen to remove any large particles.

Another preferred material to serve as the crystalline functional phase is $Bi_2O_3$ frit in finely divided powder form. This material which has a melting point of 820° C. is prepared by wet milling $Bi_2O_3$ dispersed in water with high density aluminum balls. Upon completion of the desired degree of milling which may be as long as 16 hours, the water is removed by evaporation under infrared lamps and the product is then oven dried for 24 hours.

The major functions of the glass and frit are to aid liquid phase sintering of the inorganic crystalline particulate materials and to form noncrystalline (amorphous) or crystalline materials by devitrification during the heating-cooling cycle (firing cycle) in the preparation of thick film capacitors. This devitrification process can yield either a single crystalline phase having the same composition as the precursor noncrystalline (glassy) material or multiple crystalline phases having different compositions from that of the precursor glassy material. The glass is used in concentrations of from 1 to 7% by weight.

D. Formulation

The dielectric powder compositions described above will ordinarily be formed into paste which is capable of being printed in any desired circuit pattern. In its simplest aspects such pastes are made merely by dispersing the dielectric powder mixture into an appropriate liquid vehicle.

Any inert liquid can be used as the vehicle. Water or any one of various organic liquids, with or without thickening agents, stabilizing agents and/or other common additives can be used as the vehicle. Exemplary of the organic liquids which can be used are aliphatic alcohols, esters of such alcohols such as the acetates and propionates, terpenes such as pine oil, terpineol and the like, solutions of resins such as the polymethacrylates of lower alcohols, or solutions of ethyl cellulose in solvents such as pine oil and monobutyl ether of ethylene glycol monoacetate. The vehicle can also contain volatile liquids to promote fast setting after printing to the substrate.

A preferred vehicle is based on ethyl cellulose and $\beta$-terpineol, in a weight ratio of about 1:8. The pastes are conveniently prepared on a three-roll mill. A preferred viscosity of these compositions is approximately 100-200 Pa·S, measured on a Brookfield HBT viscometer using a #5 spindle at 10 rpm. The amount of vehicle utilized is determined by the final desired formulation viscosity.

F. Applications

The dielectric compositions of this invention can be printed as film onto substrates on which a Pd/Ag conductor composition has been previously printed and fired at 850° C., either by using an automated printer or a hand printer in the conventional manner. Preferably, automatic screen stenciling techniques are employed using a 120 to 325 mesh screen. The following procedure is used for producing a thick film capacitor:

1. The silver-bearing electrode composition is printed using an automatic printer, dried at an elevated temperature such as 120° C. for approximately 15 minutes and then fired in air in a belt furnace at a peak temperature of approximately 825°-925° C. for 10 minutes, the total firing cycle being 1-1.5 hours. The fired thickness is 10-14 $\mu$m, as measured in a surfanalyzer;
2. One layer of the dielectric composition is printed over the silver-bearing electrode film using a double wet pass with a squeegee and dried at an elevated temperatures such as 125° C. for approximately 15 minutes;
3. A second layer of the dielectric composition is printed over that of the first layer and is also dried at 125° C. for 15 minutes;
4. The silver-bearing electrode composition is then printed on the top of the dielectric layer, and dried at 125° C. for approximately 15 minutes. The two dielectric layers and the top silver electrode are cofired in air in a belt furnace at a peak temperature of approximately 825°-950° C. for 10 minutes, the total firing cycle being one to 1-1.5 hours. The fired thickness of the two dielectric layers together is 30-60 as measured in a surfanalyzer.

Screen-printed cofired multilayer capacitors can also be made with the compositions of the invention by the following procedure: (1) print an electrode layer, dry and fire; (2) print a dielectric layer atop the fired electrode layer and dry it; (3) print an electrode layer overlying the dielectric layer and dry it; and (4) repeat steps 2 and 3 for the desired number of layers; and (5) cofire the assemblage comprising a plurality of alternating printed dielectric and overlying electrode layers.

The silver-bearing electrode compositions used in this invention are comprised of silver powder, palladium powder, frit, and a vehicle formulated as is well known in the art of thick film technology.

G. Definitions and Test Procedures

1. Dielectric Constant (K)

Dielectric constant is a measure of the ability of a dielectric material to store an electrical potential energy under the influence of an electrical field. Thus the ratio between the capacitance of a capacitor with the material as dielectric (ceramic in this case) to the capacitance with a vacuum as the dielectric.

2. Dielectric Material

Dielectric material is a nonconducting material or insulator that separates electrical charges and can result in the storage of an electrical charge.

3. Dissipation Factor (DF)

Dissipation factor is a measure of internal power losses due to conduction through the dielectric from one lead to the other. This power loss results in the thermal dissipation of electrical energy which is undesirable because it raises the temperature of the device.

4. Insulation Resistance (IR)

Insulation resistance is a measure of electricity leakage through the dielectric. The D.C. resistance is measured at a fixed voltage applied across the terminals of the circuit (unit).

5. Temperature Capacitance Coefficient (TCC)

The temperature capacitance coefficient is a measure of the rate of change of capacitance as a function of temperature. In particular it is the slope of the curve which result from the plot of capacitance versus temperature.

Capacitance and dissipation factors are measured using a Hewlett-Packard HP4274A multi-frequency LCR meter, while insulation resistance is measured using Super megohm meter Model RM 170 (Biddle Instruments AVO Ltd., U.K.). Insulation resistance measurements are made after charging the capacitor with 100 VDC. Each number is the average of at least 10 measurements. The thickness of the dielectric layer is measured using Gould surfanalyzer 150/recorder 250. The dielectric constant is calculated using the equation:

$$K = (C/A) \cdot t$$

where C is the capacitance of the capacitor
A—is the area of small electrode in contact with the dielectric layer.
t—is the thickness of the dielectric layer.

All capacitors were aged for at least 15 hours after firing before making the electrical measurements. It is common that the dissipation factor (DF) decreases downward from 0.5 to 2% within this aging time period. The capacitance is generally unaffected during this period.

The reversible absorption of water leading to high DF and low IR of the capacitors is evaluated using a water immersion test. This test is used as the measure of the hermeticity of the capacitor.

Three sets of capacitors are immersed in water at a temperature of 50° C. and kept under water for a maximum of 10 days. A "2095 Bath and Circulater" of Master line, Forma Scientific is used for the test. The first set of capacitors is taken out after a period of 24 hours, the second set after 5 days and the third set after 10 days. Surface water is wiped off using micro-wipes and insulation resistance is measured after charging the capacitor with 100 volts DC. Capacitors are allowed to recover and the insulation resistance is remeasured. The same set of capacitors is then immersed in water for an additional 10 days and the insulation resistance is measured again. Capacitors aged under water which show little drop in the insulation resistance are deemed to have good hermeticity.

Long term stability of the capacitor is measured by using a load-life-humidity test. In this test variation of the dielectric properties of the capacitor after storage inside an environmental chamber is taken as the measure of the long term stability. Environmental chamber conditions are within the following limits: temperature 40° C.; relative humidity up to 95%; applied direct current load up to 60 volts, depending on the ultimate use; and storage time up to 1000 hours. In the examples which follow the test conditions were 80% relative humidity, 10 volts at 40° C. for 1000 hours.

The exact mechanism of the improvement of hermeticity in thick film capacitors is not known; however certain mechanisms such as ionic processes can be postulated. The lowering of insulation resistance when the capacitors are exposed to humidity is probably related to an ionization diffusion of cations from the anodic electrode into the dielectric via grain boundaries, pores and voids toward the cathodic electrode. This ionization-ionic migration process is pronounced in the case of electrode compositions containing easily ionizable oxides. Another possible explanation is related to the sintered density of the thick film in that a dielectric thick film with tight microstructure and little or no porosity is likely to retard such ionic migration, thus increasing the hermeticity.

The addition of the claimed inorganic devitrifiable glass alters the densification characteristics of the thick film dielectric layer. The low-softening point, low-viscosity properties of the glass utilized in the dielectric compositions of the invention aid the sintering of the inorganic particulates by forming liquids during the firing cycle and wetting the particulate surfaces. Also, the triple points of the sintered body all contain liquid during the sintering. The devitrification property of the glass aids in the formation of crystalline or amorphous inorganic material from the glass, thus leaving the sintered body with little or no glass. Ionic migration through the glass structure containing ionizable "network modifiers" is relatively much higher than that of the same composition in crystalline form. The tight sintered density and pore-free microstructure of the thick film capacitor composition claimed in this invention are dependent on the viscosity of the glass, the devitrification characteristics of the glass (temperature, time, etc. needed to convert to crystalline material) and the type of inorganic ions present in the glass. The hermetic property of the invention is related to the sintered density of the thick film capacitor as well as the presence of nonionizable inorganic (modifiers) in the glass. The low TCC values of the invention as well as its ferroelectric properties are due to the presence of the perovskite.

An important characteristic of the compositions of the invention is their ability to withstand highly hermetic operating conditions when they are cofired with silver-containing conductor compositions at temperatures of below 900° C. (e.g. about 850° C.) and that encapsulation is not required despite the fact that they have been fired at such low temperatures.

The dielectric thick film formulations having such good hermetic properties therefore find use in a wide variety of microcircuit applications without the necessity of encapsulation.

The invention will be further understood by reference to the following examples which illustrate the dielectric properties and hermeticity obtainable when the compositions of the invention when they are printed and fired with silver-bearing electrode compositions. The details for fabricating a thick film capacitor are described below. The table below gives compositional information and dielectric properties for capacitors terminated with silver-bearing conductor compositions. In the following examples the vehicle constituted about 24% by weight of the total printable paste of which 14% by weight was beta terpineol and ethyl cellulose "B" in a ratio by weight of about 8:1 and 10% by weight was organic liquid consisting of about equal amounts of beta terpineol and butyl carbitol. The formulations also contained 1% by weight of Tyzor ® AA[1], a titanium resinate anti-peeling agent.

1. Tradename of E. I. du Pont de Nemours and Company, Wilmington, Del. 19898.

EXAMPLES

EXAMPLE 1

Using a substituted perovskite having the formula $Ba_{0.66}Sr_{0.34}TiO_3$ prepared by the procedure described above, a dielectric powder was formulated by dry ball milling the following constituents for 15 minutes using plastic balls and bottle.

| | | |
|---|---|---|
| Substituted perovskite | 87.3% | weight |
| Lead oxalate - doping agent | 6.3 | |
| Iron oxide - doping agent | 3.2 | |
| Zinc fluoride - doping agent | 1.6 | |
| $Bi_2O_3$ frit | 1.6 | |
| Total | 100.0 | |

The above described finely divided powder mixture (81 parts by weight) was formulated into a paste by dispersing it in 19 parts by weight of the vehicle described below. The paste was then used to fabricate a thick film capacitor by the procedure described above. (Firing temperature 850° C.). The resultant capacitor was tested to determine its dielectric properties using the above described test procedure. The results are given in Table 1 below.

TABLE 1

| Dielectric Properties | Initial | After Water Immersion Test | After Load-Life Humidity Test |
|---|---|---|---|
| Dielectric Constant | 935 | 893 | 865 |
| DF (%) | 1.8 | 1.7 | 1.5 |
| IR (Ω/100 VDC) | 1 × 10^9 | 1 × 10^8 | 1 × 10^9 |

As is shown by the small drop in dielectric properties under quite severe moisture conditions the capacitor was highly hermetic.

EXAMPLES 2 TO 4

Using the procedure described hereinabove, three substituted perovskites were prepared having the following compositions:

| Perovskite | $BaTiO_3$ (% wt.) | $SrTiO_3$ (% wt.) |
|---|---|---|
| A | 65.6 | 34.4 |
| B | 71.2 | 28.8 |
| C | 80.8 | 19.2 |

Each of these three perovskite materials was then formulated as a homogeneous dielectric powder by the same procedure as Example 1 and in the same proportions. Each of the resultant three powders was then mixed thoroughly with additional $Bi_2O_3$ frit and organic medium to form a screen-printable paste containing by weight 81% dielectric powder, 1.6% additional frit and 17.4% liquid vehicle (organic medium). The pastes were then used to fabricate thick film capacitors by the same procedure as Example 1 (firing temperature 850° C.) and the resultant capacitors were tested to determine their dielectric properties both initially and after the 10-day water immersion test. The results of the three tests are given in Table 2 below.

| | A | B | C |
|---|---|---|---|
| Perovskite Designation | | | |
| % wt. $BaTiO_3$ | 65.6 | 71.2 | 80.8 |
| % wt. $SrTiO_3$ | 34.4 | 28.8 | 19.2 |
| Dielectric Properties | | | |
| Dielectric constant-initial | 480 | 513 | 607 |
| DF (%) | 1.0 | 1.4 | 1.8 |
| IR, Initial (Ω/100 VDC) | 10^9 | 10^9 | 10^9 |
| IR, 10 days (Ω/100 VDC) | 10^8 | 10^8 | 10^8 |

The above data show that no additional hermeticity was derived from use of the additional amount of low-melting devitrifiable frit. As would be expected the added amount of frit lowered the dielectric constant from 935 to 480, but no other properties were affected.

EXAMPLE 5

A further example was carried out to demonstrate the very poor hermetic properties of the capacitors which are obtained from conventional dielectric materials consisting of 76% wt. $BaTiO_3$ and 4% wt. of a conventional lead boro bismuth silicate glass formulated into 20% wt. organic vehicle.

Upon testing a first capacitor prpeared from these materials in the same manner as in the previous examples (firing temperature 850° C.), it exhibited an initial IR of $>10^{10}$. However, when the capacitor was subjected to the 10-day water test, it shorted out and was unuseable.

A second capacitor prepared from the same materials in the same manner and having an initial IR of $>10^{11}$ ohms per 100 VDC was then encapsulated with a commercially available modified silicone protective coating (Protective Coating 240-SB from Electro-Science Laboratories, Inc., Philadelphia, PA). When the encapsulated capacitor was subjected to the 10-day water test, the IR dropped to $>10^6$ ohms per 100 VDC.

EXAMPLE 6

Yet another example was carried out to demonstrate the very poor hermeticity of capacitors which are obtained by the use of low-melting devitrifiable glass with conventional dielectric materials. In particular a screen-printable dielectric paste was formulated from 68% $BaTiO_3$, 12% $Pb_5Ge_3O_{11}$ and 20% organic vehicle.

Upon testing a first capacitor prepared from these materials in the same manner as in the previous examples (firing temperature 850° C.), it exhibited an initial IR of $10^9$ ohms. However, when the capacitor was subjected to the 10-day water test, it also shorted out and was unuseable.

When a second capacitor was encapsulated in the same manner as Example 5 and subjected to the 10-day water test, the IR of the capacitor dropped slightly to $10^8$ ohms.

This example shows that the low melting, devitrifiable glass by itself is insufficient to yield good hermetic properties at equivalent processing conditions unless it is first encapsulated. On the other hand, the compositions of the invention (Examples 1–4) all exhibit good hermeticity without encapsulation. Thus, it is clear that the very good sintering obtainable at 850° C. with low melting devitrifiable glass is not by itself sufficient to give a microstructure which can withstand the rigors of hermetic operating conditions.

I claim:

1. A dielectric powder composition for making hermetic dielectrics having an insulation resistance (IR) drop of no more than one order of magnitude after immersion in water at 50° C. for 10 days consisting essentially of a finely divided admixture of (a) a substituted perovskite of the formula $Ba_{1-x}Sr_xTiO_3$ wherein X is from 0.1 to 0.9, (b) at least one inorganic dopant containing an ionic species selected from the cations $Bi^{3+}+Ca^{2+}+Cs^{1+}+Fe^{2+}+Fe^{3+}+Pb^{2+}+Zn^{2+}$ and the anion $F^-$ and mixtures thereof, and (c) a low temperature melting devitrifiable glass or frit having a specific viscosity (log $\eta$) at the firing temperature of less than 6 and in which the relative proportions of the components, by weight, are 30–90% (a) 10–35% (b) and 1–7% (c).

2. The composition of claim 1 in which the value of X in the substituted perovskite is from 0.3 to 0.6.

3. The composition of claim 1 in which the inorganic dopant is a mixture of lead oxalate, iron oxide and zinc fluoride.

4. The composition of claim 1 in which the glass has a softening point below 850° C.

5. The composition of claim 1 in which the glass is 50–80% by weight $Pb_3O_4$ and 10–30% by weight $GeO_2$.

6. The composition of claim 1 in which the glass is a $Bi_2O_3$ frit.

7. A screen-printable dielectric composition for making hermetic dielectrics having an insulation resistance (IR) drop of no more than one order of magnitude after immersion in water at 50° C. for 10 days consisting essentially of a finely divided admixture of (a) a substituted perovskite of the formula $Ba_{1-x}Sr_xTiO_3$ wherein X is from 0.1 to 0.9, (b) at least one inorganic dopant containing an ionic species selected from the cations $Bi^{3+}+Ca^{2+}+Cs^{1+}+Fe^{2+}+Fe^{3+}+Pb^{2+}+Zn^{2+}$ and the anion $F^-$ and mixtures thereof and (c) a low temperature melting devitrifiable glass or frit dispersed in an inert liquid vehicle, the glass or frit having a specific viscosity (log $\eta$) at the firing temperature of less than 6, and in which the relative proportions of the components, by weight, are 30–90% (a) 10–35% (b) and 1–7% (c).

8. The composition of claim 7 in which the value of X in the substituted perovskite is from 0.3 to 0.6.

9. The composition of claim 7, in which the inorganic dopant is a mixture of lead oxalate, iron oxide and zinc fluoride.

10. The composition of claim 7 in which the glass has a softening point below 850° C.

11. The composition of claim 8 in which the glass is 50–80% by weight $Pb_3O_4$ and 10–30% by weight $GeO_2$.

12. The composition of claim 7 in which the glass is a $Bi_2O_3$ frit.

13. An hermetic dielectric film comprising the composition of claim 8 which has been fired at below 900° C. to remove the inert liquid and to effect liquid phase sintering and cooled to effect devitrification of the glass.

14. The film of claim 13 in which the value of X in the substituted perovskite is from 0.3 to 0.6.

15. The film of claim 13 in which the inorganic dopant was a mixture of lead oxalate, iron oxide and zinc fluoride.

16. The film of claim 13 in which the glass has a softening point below 850° C.

17. The film of claim 15 in which the glass is 50–80% by weight $Pb_3O_4$ and 10–30% by weight $GeO_2$.

18. The film of claim 13 in which the glass was a $Bi_2O_3$ frit.

19. An hermetic capacitor having an insulation resistance (IR) drop of no more than one order of magnitude after immersion in water at 50° C. for 10 days and comprising (1) a first conductor terminal on which was printed (2) an hermetic dielectric film and (3) a second conductor terminal overlying the dielectric layer, the dielectric film consisting of (a) a substituted perovskite of the formula $Ba_{1-x}Sr_xTiO_3$ wherein X is from 0.1 to 0.9, (b) at least one inorganic dopant containing an ionic species selected from the cations $Bi^{3+}+Ca^{2+}+Cs^{1+}+Fe^{2+}+Fe^{3+}+Pb^{2+}+Zn^{2+}$ and the anion $F^-$ and mixtures thereof, and (c) a low temperature melting devitrifiable glass or frit, the assemblage having been cofired at below 900° C. to remove the inert liquid therefrom and to effect liquid phase sintering and cooled to effect devitrification of the glass or frit having a specific viscosity (log $\eta$) at the firing temperature of less than 6, and in which the relative proportions of the components, by weight, are 30–90% (a) 10–35% (b) and 1–7% (c).

20. An hermetic multilayer capacitor having an insulation resistance (IR) drop of no more than one order of magnitude after immersion in water at 50° C. for 10 days and comprising a first conductor terminal and a plurality of alternating printed dielectric films and overlying conductor terminals. The dielectric film consisting essentially of (a) a substituted perovskite of the formula $Ba_{1-x}Sr_xTiO_3$ wherein X is from 0.1 to 0.9, (b) at least one inorganic dopant containing an ionic species selected from the cations $Bi^{3+}+Ca^{2+}+Cs^{1+}+Fe^{2+}+Fe^{3+}+Pb^{2+}+Zn^{2+}$ and the anion $F^-$ and mixtures thereof, and (c) a low temperature melting devitrifiable glass or frit, the assemblage having been cofired at below 900° C. to remove the inert liquid therefrom and to effect liquid phase sintering and cooled to effect devitrifcation of the glass or frit having a specific viscosity (log $\eta$) at the firing temperature of less than 6, and in which the relative proportions of the components, by weight, are 30–90% (a) 10–35% (b) and 1–7% (c).

* * * * *